Patented Oct. 16, 1951

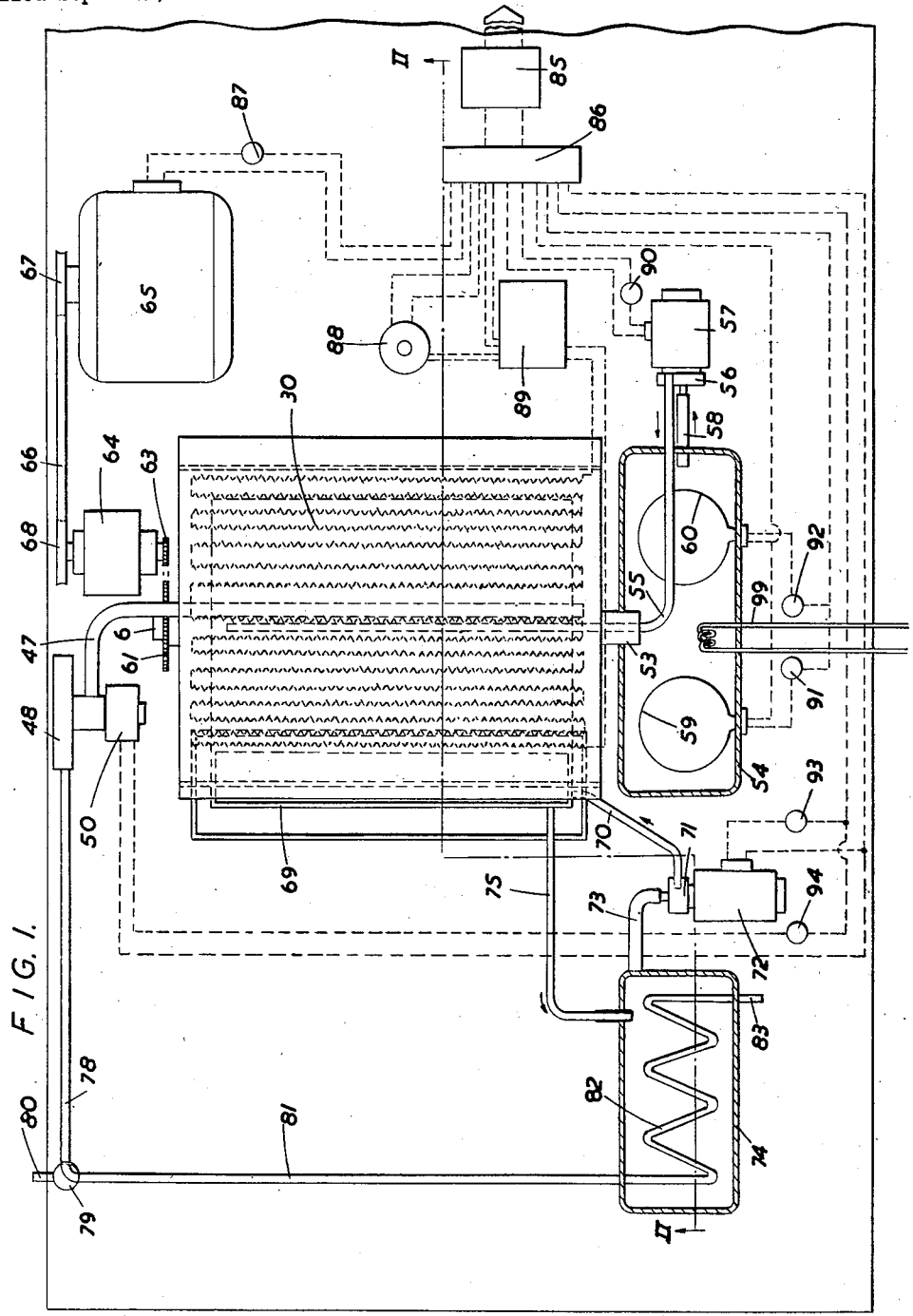

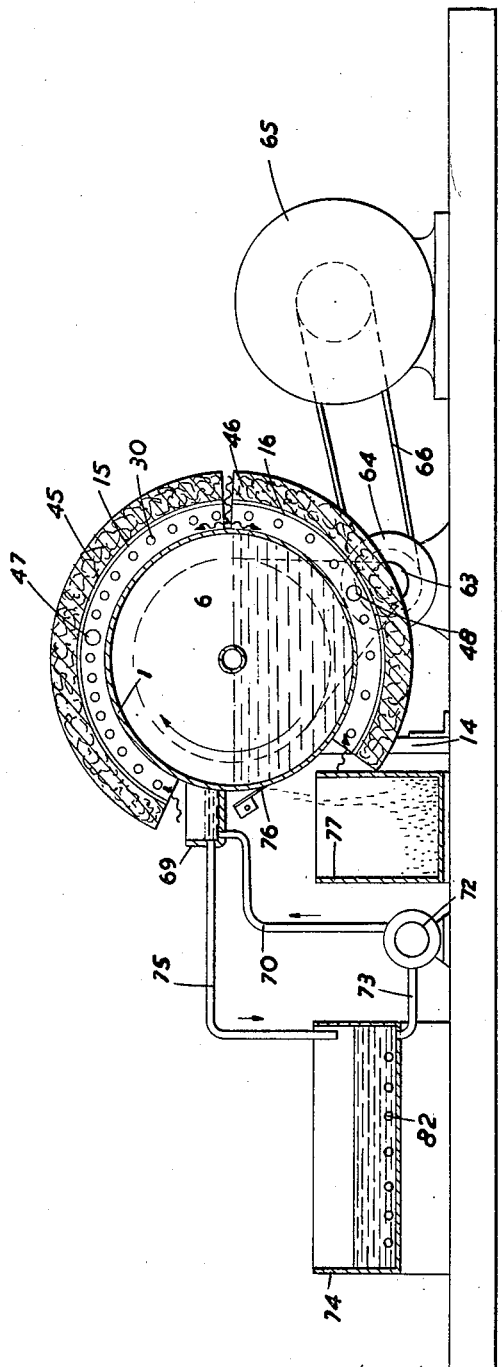

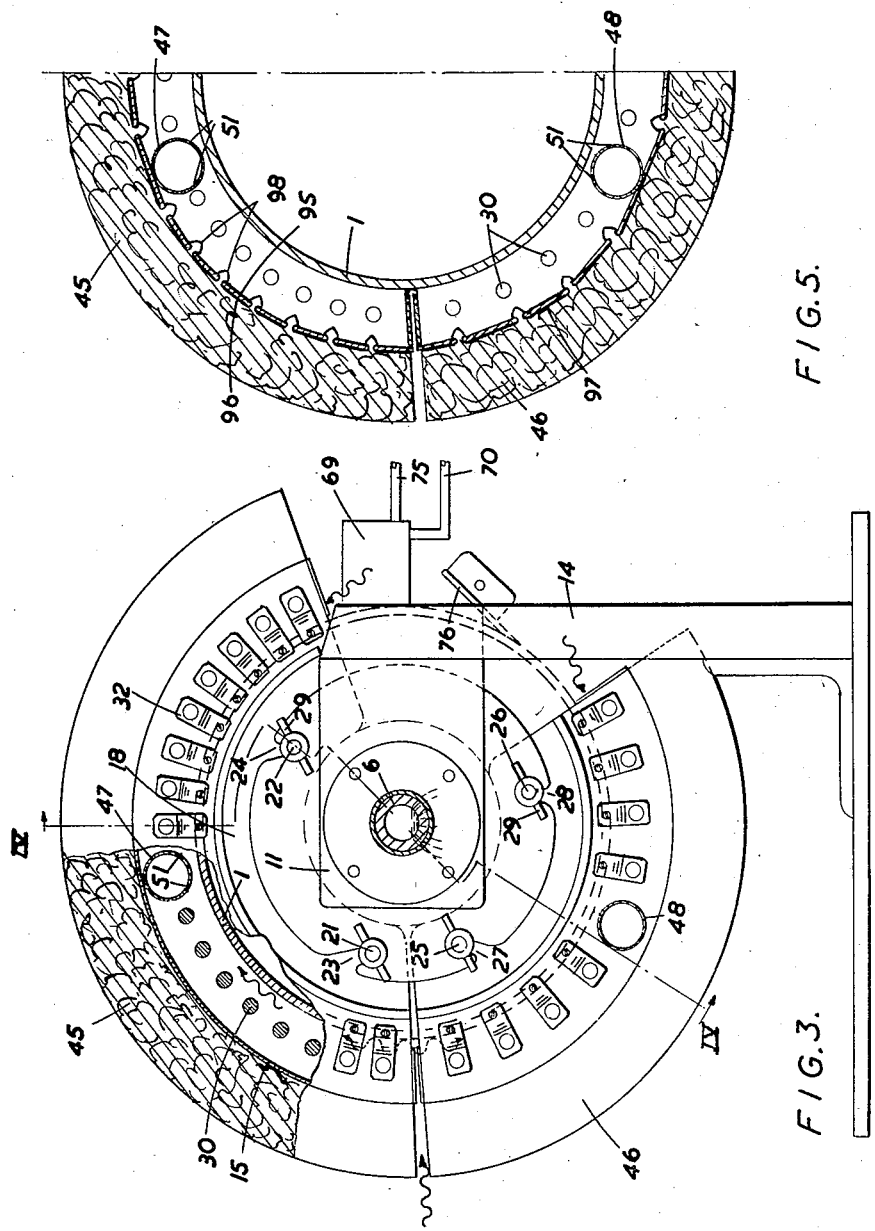

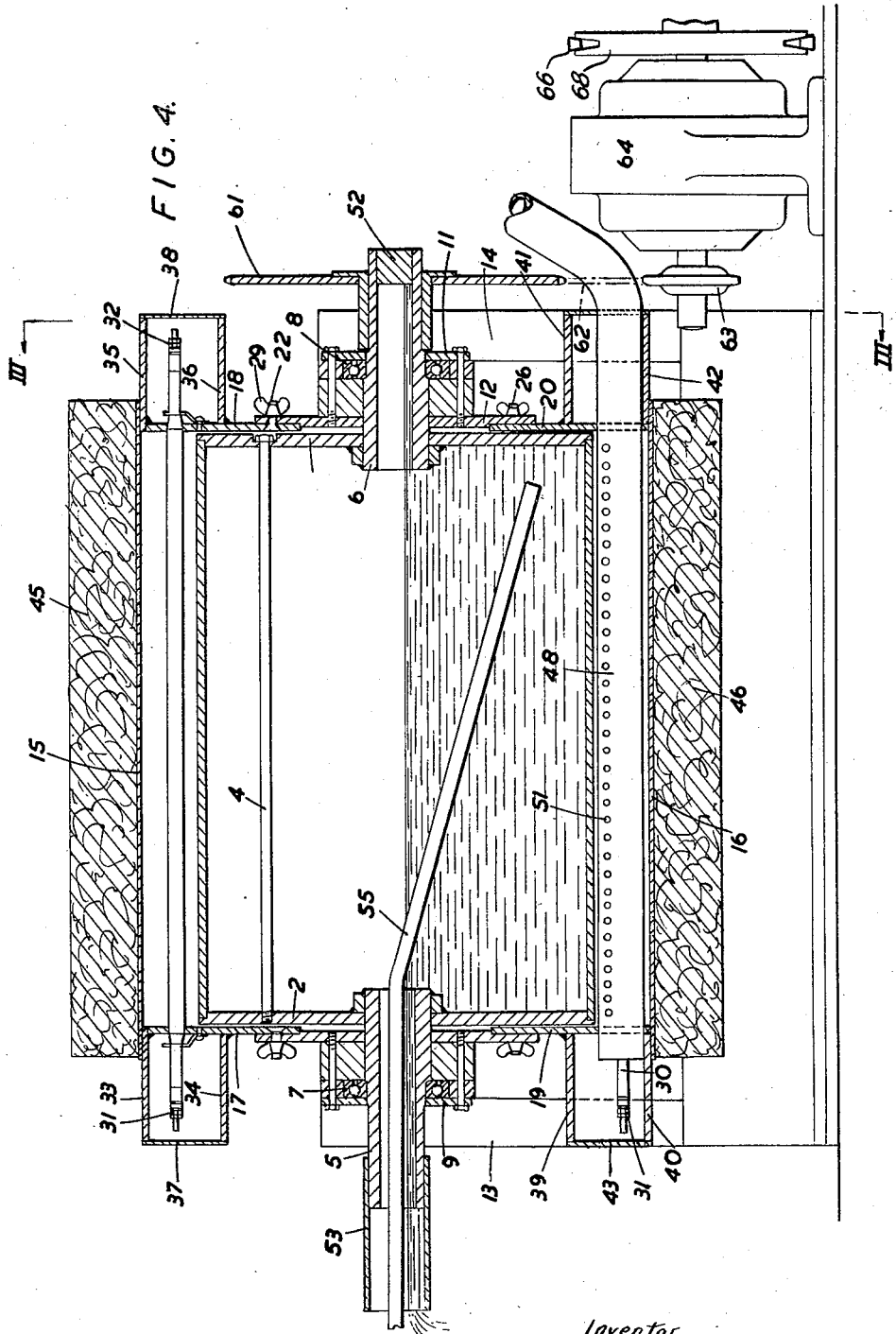

2,571,778

UNITED STATES PATENT OFFICE 2,571,778

ROTARY DRUM DRIER

Helmut John Stieger, Brough, England

Application September 21, 1949, Serial No. 116,977
In Great Britain September 8, 1948

7 Claims. (Cl. 159—10)

This invention relates to the condensation and evaporation of liquids, in particular natural and artificial solutions such as milk, coffee solution or other beverage.

An object of the invention is to provide apparatus for the continuous production of a condensate or powder from such liquid by such quick drying but at temperatures below the boiling point of the liquid that solids in the liquid are not appreciably affected.

A further object of the invention is to provide such apparatus in which evaporation is effected by infra-red rays and assisted by a current of air with control of the temperature such that the boiling point of the liquid is not reached.

A still further object of the invention is to provide such apparatus with the advantages of the simplicity of the known drum drying process, which is carried out by means of steam heated cylinders, whilst obtaining a dried product equivalent to that obtained from the large and expensive spray drying apparatus.

The above and further objects of the invention will be apparent from the following specification in which the invention is more fully described with reference to the accompanying drawings which are given for purposes of illustration and not of limitation.

In these drawings:

Figure 1 is a plan diagrammatic view of a complete liquid drying plant, utilising electrically generated infra-red rays, Figure 2 is a sectional elevation, taken on the line II—II of Figure 1 looking in the direction of the arrows, with minor parts omitted for clarity, Figure 3 is an end elevation of the evaporating part of the apparatus being a view on the line III—III of Figure 4, with part broken away to show the internal construction, Figure 4 is a longitudinal section of the evaporator being a view on the line IV—IV of Figure 3, and Figure 5 is a half-section of a modified form of reflector in the evaporator.

Referring now to the said drawings and in particular to Figures 1 to 4 thereof, an endless moving surface in the form of a cylinder I composed of polished or plated metal, glass or glazed or ceramic coated metal, which is closed off at each end by metal end plates 2, 3 (see Figure 4) which are held in position by means of securing rods 4, is mounted for rotation about a horizontal axis by means of hollow stub shafts 5, 6 respectively disposed centrally of and extending through the end plates 2, 3 to which they are made fast as by welding. The stub shafts 5, 6 are carried by anti-friction ball bearings 7, 8 held between metal plates 9, 10 and 11, 12 respectively of which the plates 9, 11 extend laterally of vertical pillars or supports 13, 14 to which they are made fast.

Extending around and spaced from the cylinder I is a reflector which focusses the rays of infra-red generators (later to be described) evenly over an area of the periphery of such cylinder. This reflector is conveniently highly polished or plated metal and is preferably formed as two arcuate parts 15, 16 as illustrated which are carried by pairs of plates 17, 18 and 19, 20 respectively of which the plates 18 and 20 may engage behind the plate 12 to be located with respect thereto by threaded studs 21, 22 (see Figure 3) on the plate 18 entering slots 23, 24 in the plate 12 and similar threaded studs 25, 26 on the plate 20 entering further slots 27, 28 and held fast as by wing nuts 29 on such threaded studs; the other two plates 17, 19 engaging in like manner with the plate 10 in an arrangement which permits removal of the reflectors 15, 16 to expose the cylinder I for ease in cleaning after slackening the wing nuts 29.

Electrical heater elements 30 generating infra-red rays in the form of metal covered rods of a construction known per se are arranged to extend across between the plates 17, 18 and 19, 20 in the spaces between the cylinder I and the reflectors 15, 16 and beyond such plates 17, 18 and 19, 20 respectively such heater elements 30 terminate in terminals 31, 32 by means of which they are connected in the electrical circuit. The projecting ends of the heater elements 30 and their terminals 31, 32 are enclosed by arcuate strips 33, 34 and 35, 36 extending normal to the plates 17, 18 respectively and co-operating plates 37, 38 in the case of the heater elements 30 associated with the reflector 15 of which there are, in the embodiment illustrated, sixteen. The heater elements 30 associated with the reflector 16, of which there are eight in the embodiment illustrated, are similarly protected by pairs of arcuate plates 39, 40 and 41, 42 normal to the plates 19, 20 and co-operating plates 43, 44. The heater elements 30 are connected in series or in parallel or some in series and others in parallel and it will be noted that the heaters 30 associated with the reflector 15 are closer together, to give greater intensity, than those associated with the reflector 16.

The reflectors 15, 16 are externally provided with heat insulating coverings 45, 46 respectively composed, for example, of asbestos wool in order to minimize heat losses.

Substantially centrally of the reflectors 15, 16 in the spaces between them and the periphery of the cylinder 1 are tubes 47, 48 respectively which extend through the plates 17, 18 and 19, 20 being beyond the plates 17, 19 closed off and beyond the plates 18, 20 extending through the plates 38, 44 for connection to an evacuating pump 49 which is driven by an electric motor 50 (see Figure 1) for the purpose which is later explained in the description of the operation of the apparatus. These tubes 47, 48 are adjacent the cylinder 1 provided each with at least two rows of holes 51 respectively through which air (indicated by wavy arrows) which freely enters at the ends of the reflectors and flows over the periphery of the cylinder 1, may enter due to the suction created by the pump 49.

The stub shaft 6 (see Figure 4) is at its outer end closed by a plug 52 whilst the stub shaft 5 is provided with a tubular extension 53 to form an overflow discharge into a water tank 54 (see Figure 1). A tube 55 extends through the stub shaft 5 to reach down near to the bottom of the cylinder 1 at the far end and water is forced through this tube 55 into the cylinder 1 by a pump 56 driven by an electric motor 57 and drawing water from the tank 54 through a pipe 58. The cylinder 1 is kept half full of water the excess of which returns to the tank 54 so that, when the pump 56 is operating there is a continuous circulation of water which is employed for regulating the temperature of the cylinder either by reduction for which purpose a coil 99 is provided in the tank 54 through which a coolant may circulate, or by increase for which latter purpose the tank 54 is also provided with electrical immersion heaters 59, 60.

The stub shaft 6 (see Figures 1 and 4) carries a toothed wheel 61 which meshes with an endless chain 62 which passes around an output toothed wheel 63 of a change speed mechanism 64, of any convenient design, receiving power from an electric motor 65 through the medium of an endless belt 66 which passes around driving and driven pulleys 67, 68 respectively. The cylinder 1 is thus rotated unidirectionally as indicated by the arrow in Figure 2 at a speed determined by the setting of the change speed mechanism 64.

An open sided liquid trough 69 carried by the supports 13, 14 is positioned adjacent the periphery of the cylinder 1, where it is exposed between the ends of the reflector assemblies 15, 16, such that the cylinder 1 forms the wall on the open side and as it rotates draws a film of liquid onto its periphery. The liquid is pumped to the trough 69 through a pipe 70 by a pump 71 which is driven by an electric motor 72. The pump 71 draws the liquid through a pipe 73 from a reservoir tank 74 and the correct level of liquid in the trough 69 is maintained by providing an overflow at an appropriate height from which a pipe 75 returns the excess liquid back to the tank 74.

Below the trough 69, a scraper blade 76 is provided to make contact with the periphery of the cylinder 1 to scrape off the dried product which falls into a collecting bin 77 (see Figure 2).

The air drawn out by the pump 49 is discharged from the pump through a pipe 78 to a two-way valve 79 which in one position connects the pipe 78 to a discharge pipe 80 opening to atmosphere and in the other position connects the pipe 78 to a pipe 81 leading to a heating coil 82, in the liquid tank 74, which is open to atmosphere at its end 83. Thus the valve 79 may be operated either to allow the discharged air, which is hot, to escape to atmosphere or to pass to the heating coil 82 for the purpose of pre-heating the liquid when so desired.

The electrical circuit comprises mains 84 connected through an isolating switch 85 to a terminal block 86 from which connections are taken to the electric motor 65 through a switch 87, to the heater elements 30 through a current regulator 88 and holding relay 89, to the electric motor 57 through a switch 90, to the immersion heaters 59, 60 through switches 91, 92 respectively, and to the electric motor 72 through a switch 93 and the electric motor 50 through a switch 94.

In the operation of the plant as for example in the drying of milk into powder, liquid or pre-condensed milk is filled into the reservoir tank 74 and the switch 85 closed. The switches 91, 92 are closed to complete the circuit to the immersion heaters 59, 60 so that their heating up heats the water in the tank 54 which is then circulated through the cylinder 1 on closing the switch 90 in the circuit to the motor 57. The cylinder 1 is set rotating on closing the switch 87 in the circuit of the motor 65. The switches 93, 94 are closed so that the pump 71 starts to pump milk into the trough 69 from the reservoir and the motor 50 works the pump 49 to draw out through the tubes 47, 48 air which freely enters at the extremities of the reflectors 15, 16 and flows through the spaces between them and the cylinder 1. The relay 89 closes to complete the circuit to the heaters 30 which heat up and generate infra-red rays to an intensity controlled by varying the current supply by the regulator 88. The infra-red rays impinge upon, and are reflected by the reflectors 15, 16 onto, the periphery of the cylinder 1 which has picked up a film of milk thereon as it moves past the trough 69. The heating effect of the infra-red rays causes the water in the milk film to vaporize and the water vapour given off is carried along with the air flowing along over the cylinder 1 to enter the tubes 47, 48 through the holes 51 therein. This air also receives some heat from the heaters 30 so that hot air and hot water vapour pass through the pump 49 but this heat need not be wasted as it may be circulated through the valve 79 and pipe 81 to the heating coil 82 to pre-heat the milk in the reservoir 74. The dried film of milk is scraped off the cylinder 1 by the scraper blade 76 and falls into the bin 77.

The warm cylinder 1 and the intensity of the infra-red rays, particularly at the start of the cycle, quickly evaporate the water in the milk without the milk reaching a temperature exceeding its boiling, as the temperature at the periphery of the cylinder 1 is controlled by the water circulated through the cylinder which also has a cooling effect as either or both immersion heaters may be switched off when the temperature of the water approaches a desired upper limit and then if further reduction in temperature is necessary by circulating coolant through the coil 99. As the lower range of temperatures for infra-red heaters is of the order of 400 to 600° F. and as such temperatures are in excess of the boiling point of milk and most other liquids, it might be desired to evaporate, the rays, if allowed to, would raise the temperature of the milk or other liquid beyond that necessary for evaporation were it not for the temperature control by the circulation of water in the cylinder 1. By means of this control the temperature during evaporation can be kept down to the order of 75° to 85° C. so avoiding a cooked milk effect with reduced solubility due to changing the solid constituents of the milk or other liquid. The temperature of operation is also regulated by varying the current supply to change the intensity of the infrared rays.

The process is continuous until the amount of milk or other liquid to be treated is nearly exhausted when the electric switches are opened and the moving parts of the plant allowed to come to rest. The plant described above is intended for reducing a liquid such as milk or other natural or artificial solution for example a solution of coffee, to a dry powder but it could also be used for condensing such liquid to a reduced water content as by increasing the speed of rotation of the cylinder 1 or reducing the intensity of the infra-red rays or by both of these expedients.

Instead of continuous reflectors 15, 16 as described above, a number of flat strip reflectors 95 may be employed when, in a convenient construction as illustrated in Figure 5, arcuate sheets 96, 97 are shaped to have projections 98 which form channels to receive and hold the strip reflectors 95. This arrangement has additional advantage in that the projections 98 act as baffles and tend to cause the air, which flows through the spaces around the cylinder 1, more to traverse close to the periphery of such cylinder which action is assisted by providing the rows of holes 51 in the tubes 47, 48 adjacent to the periphery of the cylinder.

I claim:

1. An evaporative system comprising a rotary drum, a relatively stationary shell concentrically and at least partially surrounding said drum and having a radical spacing therefrom, a heating means disposed partially about the periphery of said drum and within said spacing, and means including a conduit disposed in said spacing for conducting a current of air through said spacing and in contact with said heating means, said conduit being disposed so as to conduct air directly into said spacing from the exterior of said shell.

2. An evaporative system as set forth in claim 1, wherein said means also comprises a split sector of said shell, said split sector being exposed to atmosphere.

3. An evaporative system as set forth in claim 2, said conduit in said spacing comprising a suction tube to induce air to flow into said shell through said split casing, around a portion of said drum, and out of said spacing through said suction tube.

4. An evaporative system as set forth in claim 2, including an additional suction tube within said spacing and disposed on the opposite side of said split sector relative to said first suction tube, whereby said tubes induce a current of air to enter said casing through said split sector causing said current of air to divide in opposite peripheral paths in passing around said drum toward said suction tubes.

5. An evaporative system comprising a rotary drum, a relatively stationary shell concentrically and partially surrounding said drum and having a radial spacing therefrom, a heating means disposed partially about the periphery of said drum and within said spacing, including means for circulating water at a predetermined temperature through said drum, including a circulatory system for said water, comprising a tank having a heating means and a cooling means therein, and respective control elements for controlling said means.

6. An evaporative system according to claim 1, including reflector means comprising a plurality of flat reflector strips held in channels formed by projections in a backing sheet, said projections also serving as baffles which cause the air flowing over the cylinder to tend to move closer thereto.

7. An evaporative system according to claim 1, wherein said heating means comprises a plurality of electrical infra-red generators of elongated shape disposed parallel to the axis of said drum and spaced from each other substantially about the periphery of said drum, and said shell comprises polished plates concentrically spaced from said generators to reflect the rays therefrom toward said drum.

HELMUT JOHN STIEGER.

REFERENCES CITED

The following references are of record in the file of this patent:

UNITED STATES PATENTS

| Number | Name | Date |
| --- | --- | --- |
| 913,760 | Osborne | Mar. 2, 1909 |
| 1,353,980 | Yahn | Sept. 28, 1920 |
| 1,501,513 | Boberg | July 15, 1924 |
| 1,670,900 | Peterson | May 22, 1928 |
| 1,689,935 | Shuell | Oct. 30, 1928 |
| 1,691,334 | Braden | Nov. 3, 1928 |
| 1,989,255 | Wood | Jan. 29, 1935 |
| 2,181,731 | Hinckley | Nov. 28, 1939 |
| 2,230,944 | Hall | Feb. 4, 1941 |
| 2,434,966 | Sherman | Jan. 27, 1948 |

FOREIGN PATENTS

| Number | Country | Date |
| --- | --- | --- |
| 24,634 | France | May 23, 1922 |
| 883,178 | France | Mar. 15, 1943 |